Aug. 23, 1955     H. J. BENEKE     2,715,810
GRASS SHIELD FOR LAWN MOWER
Filed Aug. 3, 1953
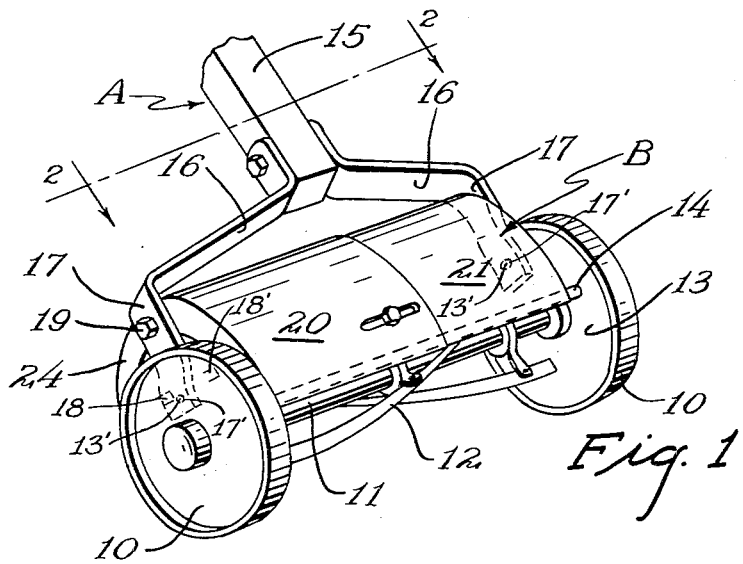
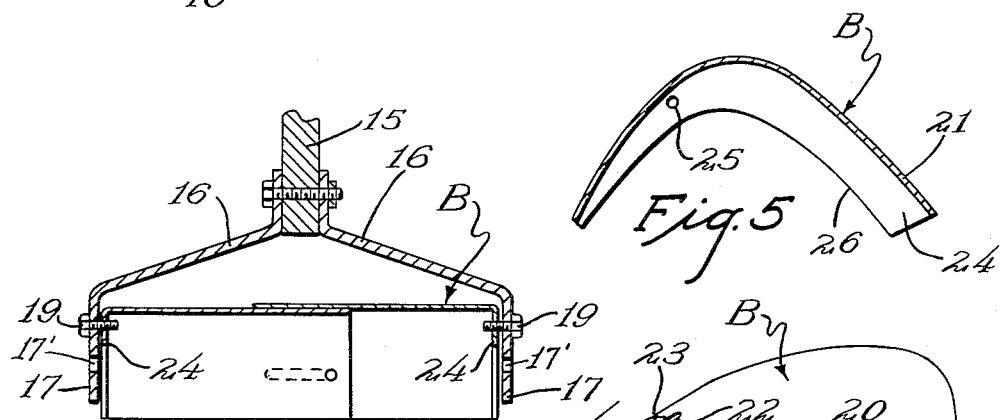
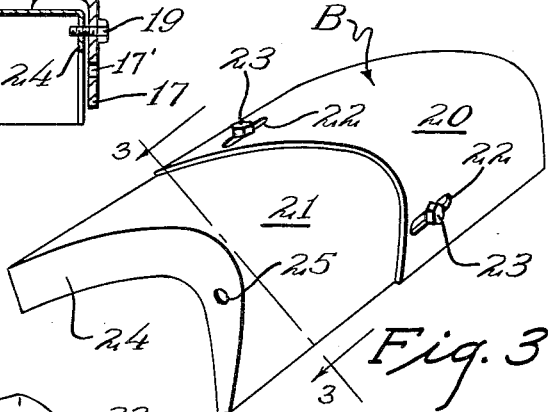
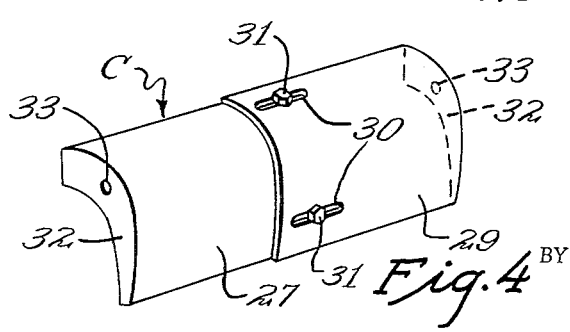
INVENTOR
Herman J. Beneke
Robert M. Dunning
BY
ATTORNEY

United States Patent Office 2,715,810
Patented Aug. 23, 1955

2,715,810

GRASS SHIELD FOR LAWN MOWER

Herman J. Beneke, Faribault, Minn.

Application August 3, 1953, Serial No. 372,113

4 Claims. (Cl. 56—249)

This invention relates to an improvement in grass shield and deals particularly with a device designed to fit upon a lawn mower and to deflect the grass cut by the lawn mower reel.

A feature of the present invention resides in the provision of a shield which is designed to extend over a lawn mower reel and to deflect the grass thrown rearwardly by the cutting reel back into the blades so as to cut the grass ends into small pieces. When cut up in this manner, the cut grass acts as a fertilizer upon the lawn.

A feature of the present invention resides in the provision of a shield which will fit upon a lawn mower of usual construction and which will accomplish the result described. The device is also capable of preventing the grass and other material thrown rearwardly by the cutting reel from striking the legs and shoes of the person using the mower. The grass cut by the lawn mower usually tends to fill up trouser cuffs and in some instances the reel throws small stones and other such material rearwardly with sufficient speed to cause a painful injury. These difficulties may be obviated by the present device.

Various types of guards and enclosures have been provided to accomplish a similar purpose. However, in the past, it has been usual practice to form the enclosure as a part of the lawn mower and to build the mower frame with the closure as a part thereof. These previous structures have, in some instances, been objectionable when a stick or other object becomes caught between the cutter reel and the stationary blade. Difficulty is often experienced in removing such objects.

An important feature of the invention lies in the fact that the rotating cutting reel acts to some extent like a blower; and by enclosing the reel in the manner described, the reel tends to draw the grass by suction toward the blades. When the reel is not enclosed, this effect is lost.

A feature of the present invention resides in the fact that the shield is pivotally secured at opposite ends to the handle fork rather than to the lawn mower frame and, accordingly, is movable therewith. The forward end of the shield in preferred form engages over a transverse frame member at the uper front portion of the lawn lower frame and is slidable thereover. The shield is so constructed as to normally remain in contact with this transverse frame member. When the handle is swung upwardly beyond normal cutting position, the reel of the cutting reel is exposed, permitting objects to be removed therefrom. Furthermore, the pivotal arrangement is such that the forward part of the shield may be elevated if desired to gain access to the forward portion of the reel.

These and other objects and novel features of the invention will be more clearly and fully set forth in the following specification and claims.

In the drawings forming a part of the specification, Figure 1 is a perspective view of a lawn mower with the shield in place thereupon.

Figure 2 is a partial sectional view through a lawn mower handle when viewed, for example, on line 2—2 of Figure 1 showing the manner in which the shield may be attached thereto.

Figure 3 is a perspective view of the rear of the shield.

Figure 4 is a perspective view of a modified form of the shield.

Figure 5 is a sectional view illustrating an end portion of the shield when taken on line 3—3 of Figure 3 and in reverse position.

The lawn mower is indicated in general at A and may be of any common type of hand-powered lawn mower with a rotatable cutting reel. Certain types of power mowers can also use the shield and many types of power mowers can employ the modified form of construction illustrated in Figure 4.

In the particular construction illustrated, the lawn mower includes a pair of wheels 10 which act through a suitable drive mechanism to rotate a cutter bar 11 supporting a cutter reel 12. The inner surfaces of the wheels 10 are normally enclosed by frame portions 13 which are non-rotatable and which support a transverse frame member 14 usually in the form of a rod.

A handle 15 is provided at its lower end with diverging handle irons 16 which are supplied at their outer ends with parallel arms 17 which extend between, and are pivotally attached to the frame members 13. These arms 17 are usually provided with apertures 17' which ride on pins 13' which are integral portions or bolts extending inwardly from members 13. Usually suitable lugs, 18 and 18' extending inwardly from member 13, are provided for limiting the pivotal movement of the handle irons 16 with respect to the frame member 13. The handle irons form a yoke which engages opposite sides of the lawn mower frame, more or less in the manner described, and which may be varied in height to suit the person using the mower.

The shield B is supported between the parallel ends 17 of the handle irons 16. Pivot bolts or studs 19 extend through the parallel members 17 and into opposite ends of the shield B to pivotally connect the shield to the handle iron sides.

As shown in the drawings, the shield B includes two covered shield portions 20 and 21 which are slidably connected together. The two shield portions are arranged in overlapping relation. One shield portion such as 20 is provided with transverse slots 22 and bolts 23 extend through these slots 22 and hold the shield parts in adjusted relation. The purpose of the overlapping construction is to provide an adjustable shield structure which will fit lawn mowers of different widths. Each of the shield parts 20 and 21 are provided with a right angularly extending flange 24 extending along an edge thereof. These flanges 24 extend between the parallel sides 17 of the handle irons 16 and are apertured as indicated at 25 to accommodate the pivot bolts 19. While the bolts 19 are shown threaded into the parallel sides 17, obviously, a nut could be inserted between each member 17 and the adjacent flange 24 so as to hold the bolts 19 in position and to hold the flanges 24 closely adjacent to the frame sides 17. The shield flanges 24 rest upon the cross member 14 and as the portion of the shield between the forward end of the shield and the pivot apertures 25 are considerably longer than the downwardly inclined reel portion of the shield, the weight of the shield maintains the edge 26 of the flanges 24 in engagement with the cross member 14. The reel portion of the shield extends downwardly behind the cutting reel and by raising and lowering the handle 15 during the mowing operation, a greater or smaller percentage of the grass being cut will strike the shield and be deflected back into the cutting reel. The cutting reel then tends to throw the cut grass forwardly in the path of the reel so that it becomes finely divided. The shield B may be lifted to expose the reel portion of the cutting reel by swinging the handle 15 upwardly. This not only lifts the reel end of the shield, but tends to cause it to swing downwardly at its front end, thereby permitting access to the cutting reel to remove foreign objects therefrom. The forward end of the shield may be manually tilted upwardly to expose the front portion of the reel when desired.

As indicated in Figure 4, the forward portion of the shield may be eliminated with the elimination of certain of the advantages described. The shield C includes two portions 27 and 29 which are in overlapping relation. The member 29 is slotted as indicated at 30 to accommodate clamping bolts 31 which hold the two parts to a desired width. The ends of the shield are provided with flanges 32 and a pivot opening 33 is provided near the upper and forward end of the shield. When this shield C is mounted by the pivot bolts 19, it is suspended downwardly, rearwardly of the cutter wheel, and prevents grass and other material from being thrown rearwardly against the legs of the operator. This shield does not function as effectively as the shield B in cutting up the grass into small particles, but does provide a hinged shield which will prevent injury to the operator of a power mower due to the stones or other objects which may be thrown rearwardly by the reel. The portion of the shield forwardly of the aligned pivot openings 33 act to partially counterbalance the weight of the shield so that it will depend at the desired angle.

In accordance with the patent statutes, I have described the principles of construction and operation of my method for producing a grass shield, and while I have endeavored to set forth the best embodiment thereof, I desire to have it understood that obvious changes may be made within the scope of the following claims without departing from the spirit of my invention.

I claim:

1. In combination a lawn mower structure of conventional character and a grass shield pivotally attached to the handle thereof, said lawn mower including a frame member, a reel, a forward transverse cross rod connected between opposite sides of said frame member, a handle connected to a pair of diverging handle irons having parallel outer ends, and pivotal attaching means connecting said outer ends to said frame member, said grass shield including an arcuate shaped body having depending angular flange ends pivotally secured to the said parallel outer ends of said diverging handle irons, said shield having a rear portion extending downwardly rearwardly of the lawn mower frame and a forward portion resting forwardly freely on said transverse cross rod over said reel, whereby when said handle is lifted to raise the rear portion of said shield the forward portion swings downwardly riding over said cross rod and said forward portion may be freely tilted independent of moving said frame member.

2. In combination a lawn mower structure of conventional character and a grass shield pivotally attached to the handle thereof, said lawn mower including a frame member, a reel, a forward transverse cross rod connected between opposite sides of said frame member, a handle connected to a pair of diverging handle irons having parallel outer ends, and pivotal attaching means connecting said outer ends to said frame member, said shield including an arcuate shaped body provided with depending flanges on opposite ends thereof, pivotal means securing said flanges and mounting said shield between said parallel outer ends, said shield having a rear portion extending downwardly rearwardly of the lawn mower frame and a forward portion pivotally balanced over the reel by said pivotal means and freely tiltable upwardly to expose the front portion of the reel independently of moving said frame member.

3. The structure of claim 2 wherein the shield body is formed of two similar half shield portions in overlapping expansible relation, one of said half shield portions being provided with transverse slots through which bolts extend from said other half shield portion to hold the shield portions in adjusted position, and each of said shield portions being provided with depending flanges having apertures therein to pivotally mount the said two shield portions on said pivotal securing means between said outer pivotal ends.

4. In combination a lawn mower structure of conventional character and a grass shield pivotally attached to the handle thereof, said lawn mower including a frame member, a reel, a forward transverse cross rod connected between opposite sides of said frame member, a handle having a bifurcated end pivotally secured to opposite sides of said frame, said shield including an unbalanced curved shield body pivotally secured between opposite sides of said pivotal bifurcated end, a rear portion of said shield extending downwardly rearwardly of reel, and a forward portion of said shield normally resting on said forward transverse cross rod and freely tiltable therefrom.

References Cited in the file of this patent
UNITED STATES PATENTS

| | | |
|---|---|---|
| 1,459,034 | Quimby | June 19, 1923 |
| 2,308,218 | Underwood | Jan. 12, 1943 |
| 2,517,184 | Elliott et al. | Aug. 1, 1950 |
| 2,599,883 | Aske | June 10, 1952 |